(12) United States Patent
Marvin

(10) Patent No.: US 7,518,258 B1  
(45) Date of Patent: Apr. 14, 2009

(54) SYSTEM FOR OPERATING A GENERATOR AS A MOTOR IN A TURBINE WIND POWER GENERATING SYSTEM

(75) Inventor: Russel Hugh Marvin, Goshen, CT (US)

(73) Assignee: Optiwind Inc., Torrington, CT (US)

( * ) Notice: Subject to any disclaimer, the term of this patent is extended or adjusted under 35 U.S.C. 154(b) by 12 days.

(21) Appl. No.: 11/903,367

(22) Filed: Sep. 21, 2007

(51) Int. Cl.  
*F03D 9/00* (2006.01)

(52) U.S. Cl. .............................. 290/44; 290/55; 322/44

(58) Field of Classification Search .............. 290/44, 290/55; 322/44  
See application file for complete search history.

(56) References Cited

U.S. PATENT DOCUMENTS

| 7,378,820 B2 * | 5/2008 | Liu et al. ...................... 322/44 |
| 7,432,686 B2 * | 10/2008 | Erdman et al. ................ 322/44 |

\* cited by examiner

*Primary Examiner*—Nicholas Ponomarenko  
*Assistant Examiner*—Iraj A Mohandesi  
(74) *Attorney, Agent, or Firm*—Ted Paulding

(57) ABSTRACT

SYSTEM FOR OPERATING A GENERATOR AS A MOTOR IN A TURBINE WIND POWER GENERATING SYSTEM includes a controller and Four Quadrant or Regenerative Drive Circuitry which alternatively operates one or more generators as motors.

10 Claims, 6 Drawing Sheets

US 7,518,258 B1

SYSTEM FOR OPERATING A GENERATOR AS A MOTOR IN A TURBINE WIND POWER GENERATING SYSTEM

BACKGROUND OF THE INVENTION

Twin wind turbines mounted on a common rotatable support for rotation about horizontal axes are shown in the following U.S. patents, disclosures incorporated herein by reference:

U.S. Pat. Nos. 4,021,140
   4,156,579
   4,288,199
   4,332,518
   4,540,333

Reference is also had to U.S. patent application Ser. No. 11/820,741, entitled IMPROVED CONTROL SYSTEM FOR TWIN TURBINE WIND POWER GENERATING SYSTEM, filed Jun. 19, 2007, invented by Russel H. Marvin, hereby incorporated herein by reference.

Reference is also had to U.S. patent application entitled IMPROVED GENERATOR OUTPUT CIRCUITRY FOR TWIN TURBINE WIND POWER GENERATING SYSTEM invented by Russel H. Marvin, and filed of even date herewith, hereby incorporated herein by reference.

It is the general object of the present invention to provide a wind turbine generating system as mentioned with a controller for operating at least one generator as a motor; the overall system being desirably simple in design, capable of being constructed at economic advantage and yet highly efficient and durable in operation.

SUMMARY OF THE INVENTION

In fulfillment of the foregoing object and in accordance with the present invention a DC converter is provided for each of the twin turbine AC generator systems in a twin turbine arrangement. Each boost converter receives the output of its respective AC generator driven by an associated wind turbine. Sensing means monitors at least one parameter such as power, speed, voltage or current output of one generator and a controller is provided to receive signals from the sensing means. The controller includes a reference in the form of a predetermined desired performance curve for the generator and is connected with the boost converter and operates to adjust the generator output in accordance with the desired performance curve. Further, the controller operates to adjust generator output to adjust the thrust of the turbine associated therewith and thus adjusts the angular position of the support associated with the turbines.

More particularly, the adjustment of the output of the said one generator is accomplished by adjusting the PWM duty cycle of the boost converter associated with the said one turbine.

Preferably, the controller employs current and voltage or speed signals from the sensing means to calculate actual power and compare the same with the predetermined performance curve. When an AC generator is employed as in the present instance, frequency may of course be sensed as the speed signal. Upper and lower power limits may also be established.

Further, the generator is preferably of the permanent magnet three-phase type with at least one phase sensed.

In addition to the foregoing control parameters, it is advantageous to have a position sensor for the turbine support means, which advises the controller of the instantaneous angular position of the support. Meteorological data including wind speed and direction is also desirable and is supplied to the computer from appropriate instrumentation on a stationary portion of a tower, which carries the supports for the wind turbines.

It should also be noted that the supports for the turbines are configured to split and accelerate a stream of wind as it approaches the turbines and may therefore be properly referred to as accelerators as well as supports.

Finally, a dual mode function in the controller operates in conjunction with power switches which in turn operate one or the other or both generators as motors.

DESCRIPTION OF PREFERRED EMBODIMENT

Figure 1:
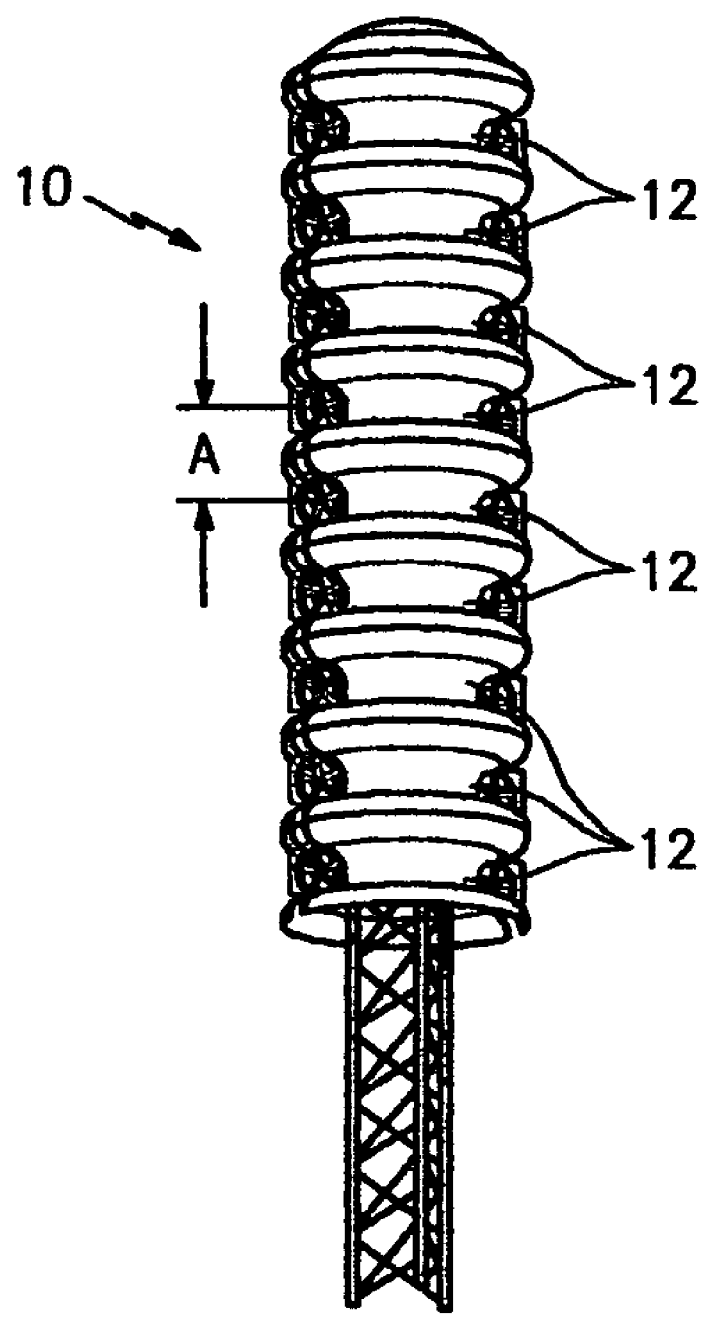
FIG. 1 is a schematic view of a tower carrying a vertical series of supports or accelerators each in turn carrying a pair of wind turbines spaced apart horizontally and each rotatable about a horizontal axis, the axes being in parallel relationship.

Referring particularly to FIG. 1, a tower indicated generally at 10 carries ten (10) horizontally rotatable accelerators 12, 12.

Figure 2:
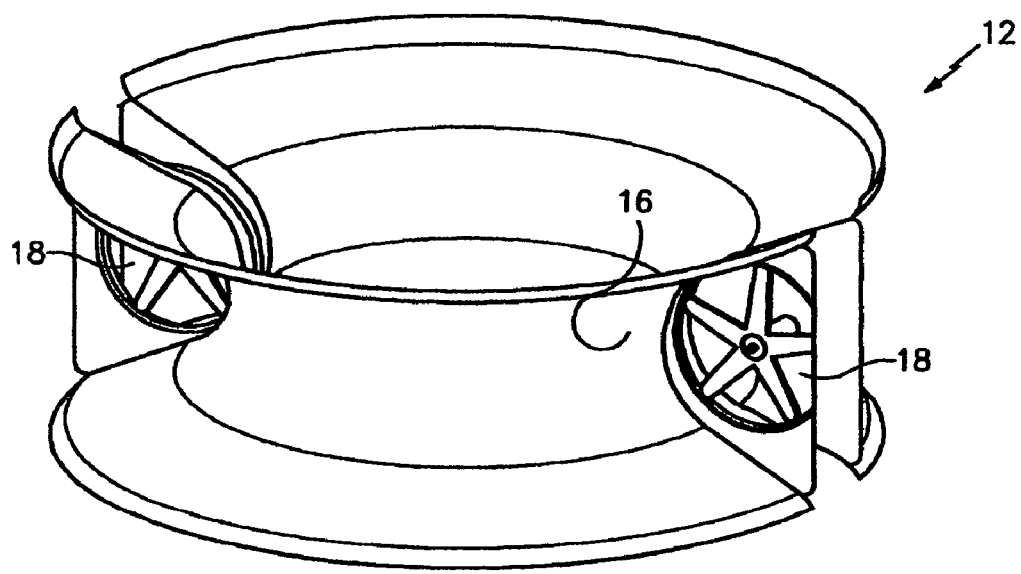
FIG. 2 is an enlarged view of a single support or accelerator and a pair of wind turbines mounted thereon.
Figure 3:
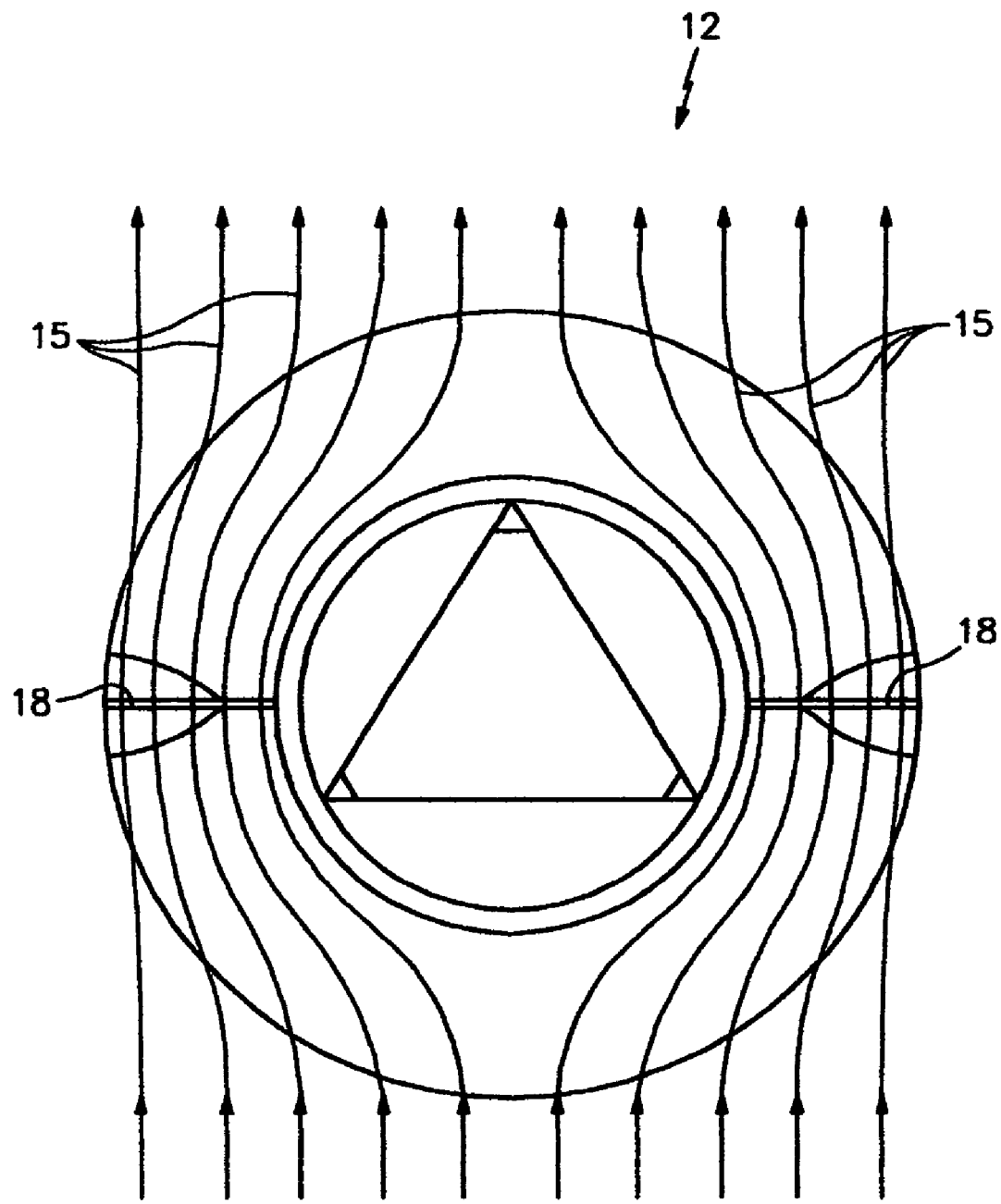
FIG. 3 is an enlarged horizontal cross sectional view through a support or accelerator showing wind flow therethrough.

As best illustrated in FIG. 2, each accelerator 12 takes a generally circular configuration with an annular recess 16, approximately semi-circular in cross section, opening radially outwardly and extending throughout its circumference. Twin turbines 18, 18 are mounted on horizontal shafts and spaced apart one hundred and eighty degrees to receive bifurcated wind generated air streams as best illustrated in FIG. 3. As will be apparent, each stream of air is accelerated as it proceeds from the front of the accelerator rearwardly and outwardly about the arcuate surface of the recess 16.

Figure 4A:
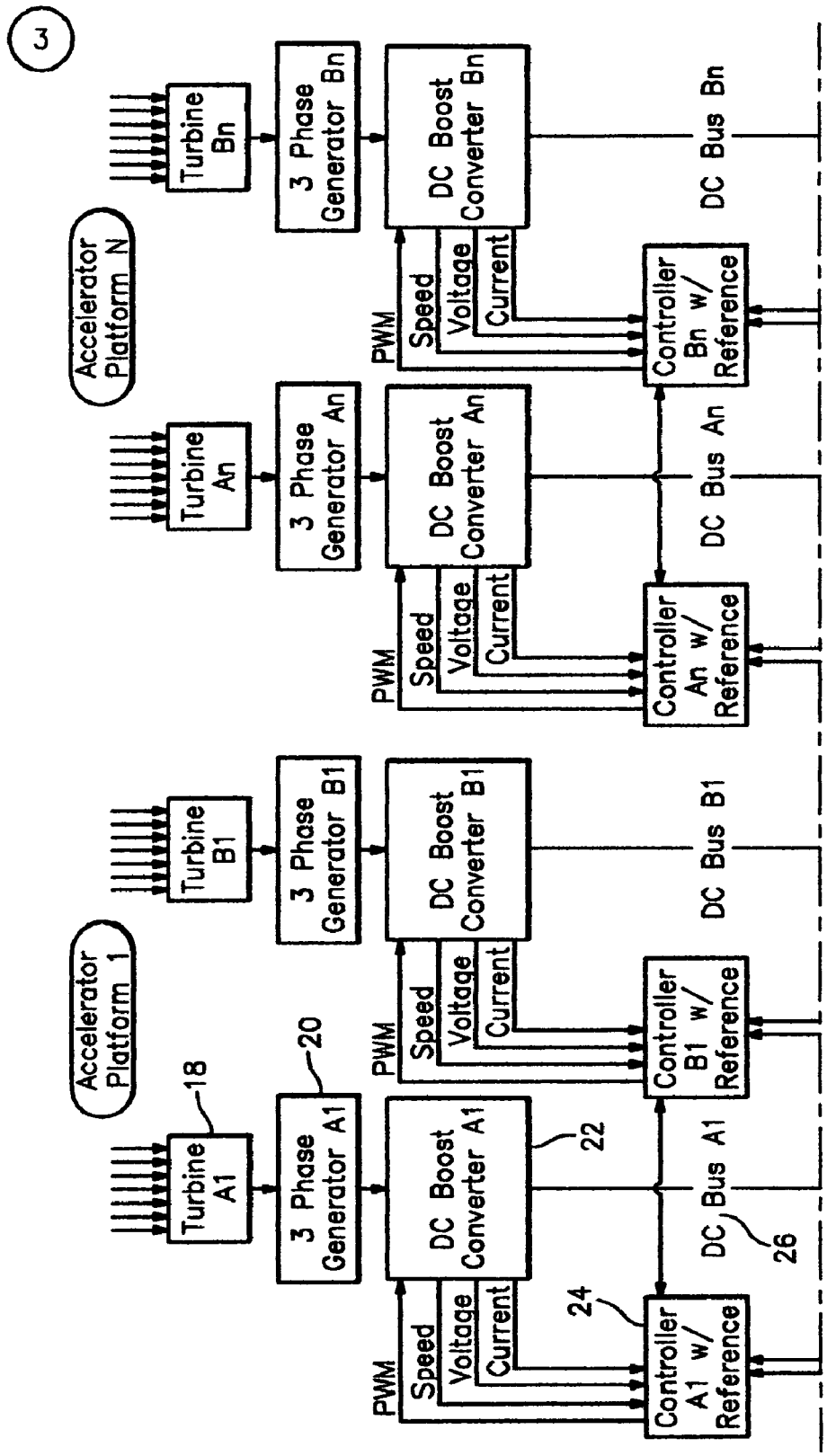
FIG. 4 is a block diagram illustrating twin turbines and their associated generators and control means.
Figure 4B:
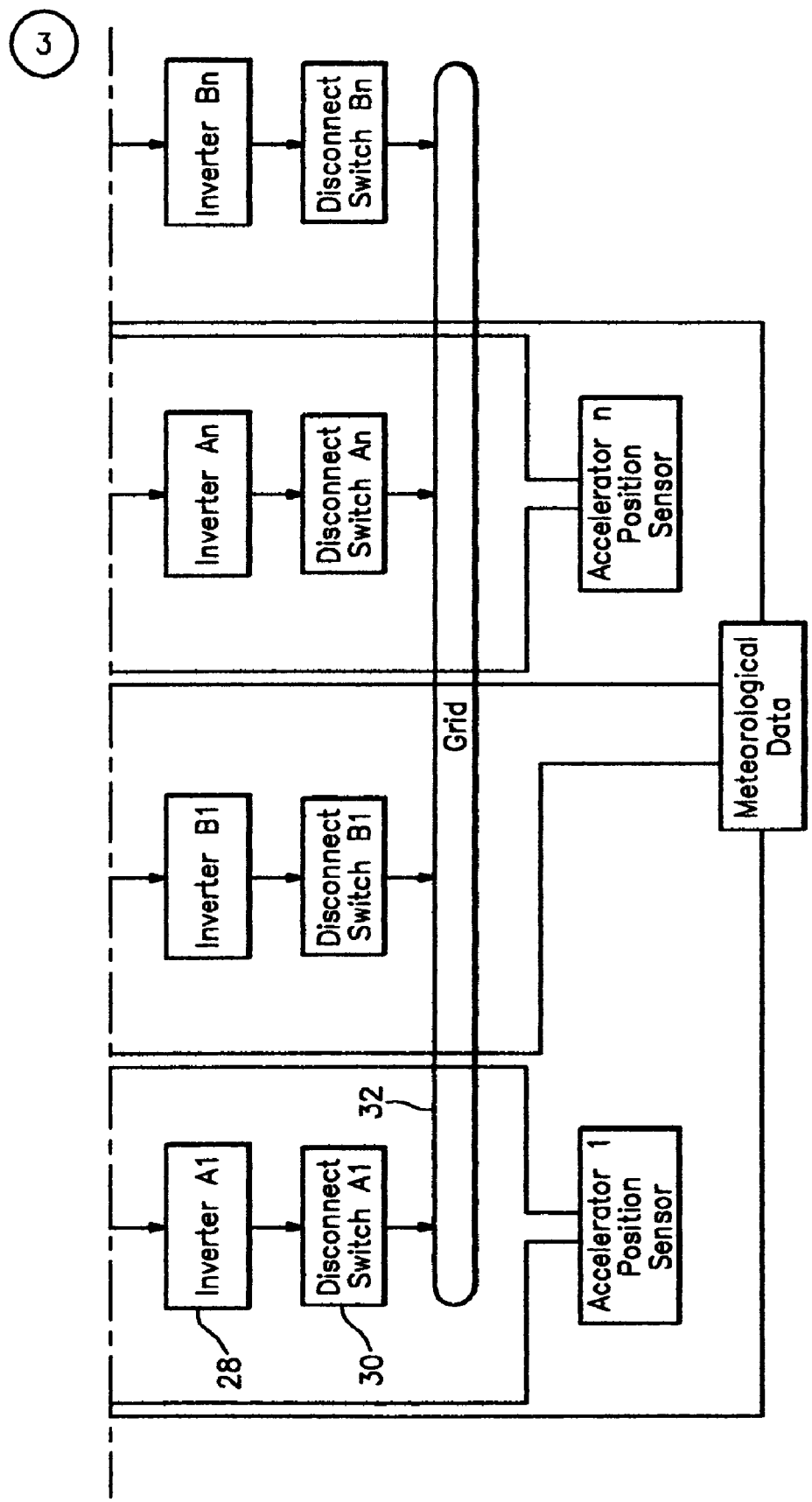

Referring now to FIG. 4, it will be obvious that all four turbine generator control systems are or may be identical with A1 and B1 representing turbines in common on a first accelerator and An and Bn representing turbines mounted in common on other accelerators. The A1 system will be described as representative. Turbine 18 drives AC generator 20 which may be conventional and of a variety of different constructions but which is preferably of the three-phase permanent magnet type.

DC boost converter 22 may be conventional with variable pulse width capability and has at least one parameter sensing means and preferably speed, voltage and current sensing means associated therewith and connected with the controller 24. Controller 24, is preferably a conventional micro processor type, receives signals from the sensing means, calculates power therefrom, and compares with a reference in the form of a desired performance curve. The computer 24 then adjusts the PWM duty cycle to adjust generator output as required to bring the output into compliance with the desired curve. Further, the computer serves to adjust the generator output to adjust the thrust of its associated turbine and thereby adjust the angular position of the accelerator to maintain an optimum angle of attack for the wind relative to the turbine blades. This is accomplished by adjusting the relative thrust until the accelerator stops rotating.

Figure 5:
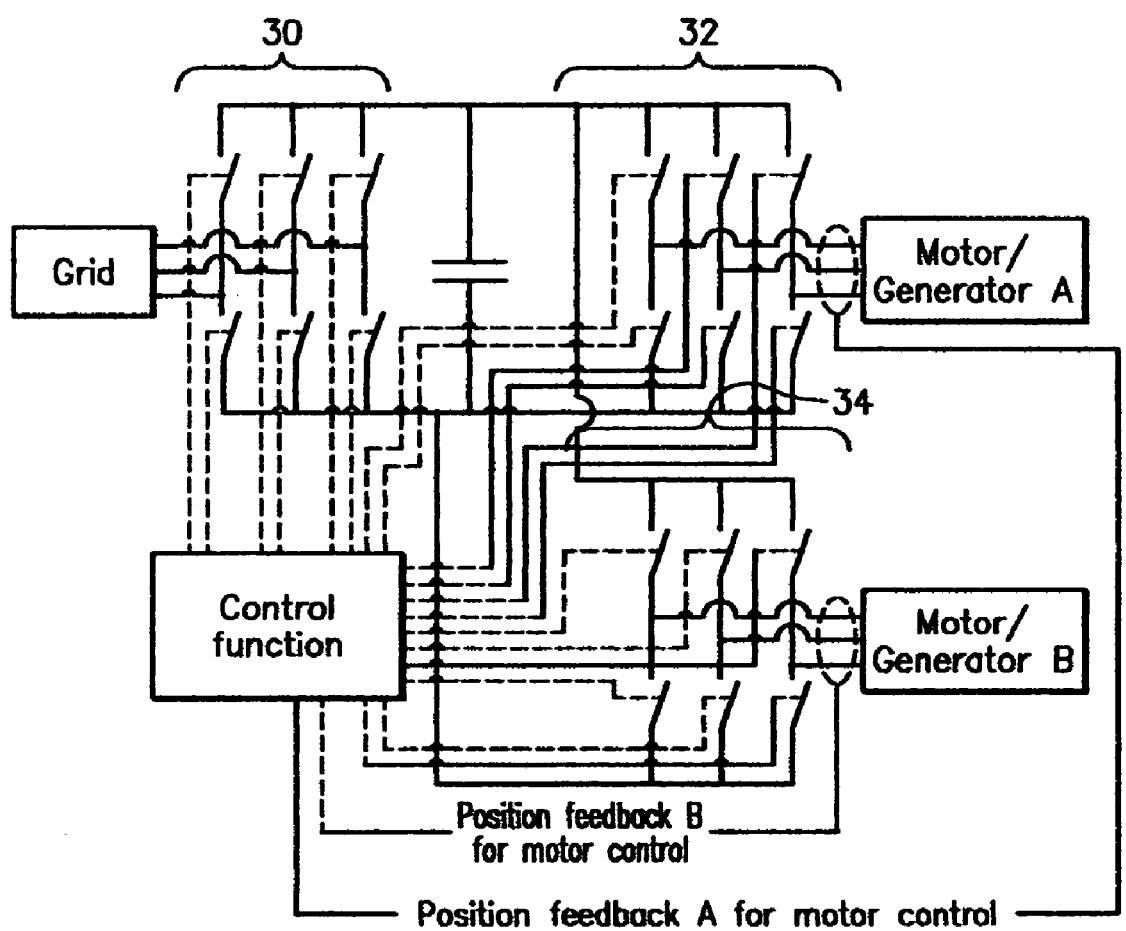
FIG. 5 is a schematic illustration of Four Quadrant or Regenerative Drive Circuitry monitored by the controller to determine either generator or motor operation.

The controller may also operate to convert the operation of one or both generators to operation in the mode of motors. This is accomplished by the Four Quadrant or Regenerative Drive Circuitry of FIG. 5 wherein the controller 24 has two modes of operation. In a first mode of operation the generator 20 operates as a generator and in the second mode of operation the generator is operated as a, motor. When the first bank of switches 30 are operated as a boost converter and the second and third banks of switches 32, 34 as motor controls, the generators operate as motors. In the alternative, when the first bank of switches are operated as an inverter and the second and third bank as boost converters, the generators are operated as generators.

From the foregoing it will be apparent that a desirably simple generator-motor conversion system has been provided for ease and convenience in manufacture and for efficient operation over a long service life.

The invention claimed is:

1. In a wind power generating system comprising at least one wind turbine mounted on a horizontally rotatable support, said turbine being connected in driving relationship with an electrical generator in turn connected with an external load; a DC converter and power switches receiving the output of said generator, sensing means monitoring at least one parameter of operation of said one generator, a controller connected with and receiving signals from said sensing means and controlling said one generator, inverter means receiving the output of said DC converters, and power switches connected with said controller and serving to alternatively operate the generator as a motor.

2. A wind powered generating system as set forth in claim 1 wherein two or more wind turbine and generator systems are provided.

3. A wind powered generating system as set forth in claim 2 wherein thrust from running at least one generator as a motor is employed to adjust the relative position of the turbines.

4. A wind powered generating system as set forth in claim 2 wherein the generators are of the three phase type, and wherein the current and voltage of at least one phase are both sensed.

5. A wind turbine generating system as set forth in claim 1 wherein the controller calculates the power output from the speed and current outputs of said one generator.

6. A wind turbine generating system as set forth in claim 1 wherein a support position sensor is included and advises the controller of the angular position of the support.

7. A wind turbine generator as set forth in claim 1 wherein a vertical series of supports each carrying a pair of wind turbines are mounted on a vertical tower having stationary sections, and wherein meteorological data gathering devices are mounted on a stationary section and connected with said controller.

8. A wind turbine generating system as set forth in claim 7 wherein the data includes wind speed.

9. A wind turbine generating system as set forth in claim 6 wherein the data includes wind direction.

10. A wind turbine according to claim 9 wherein at least one turbine may be operated as a motor when the wind is blowing predominately in a direction perpendicular to the axis of rotation of the turbines.

\* \* \* \* \*